United States Patent

[11] 3,548,942

| [72] | Inventor | William M. Terry<br>Houston, Tex. |
|---|---|---|
| [21] | Appl. No. | 833,052 |
| [22] | Filed | June 13, 1969 |
| [45] | Patented | Dec. 22, 1970 |
| [73] | Assignee | Esso Production Research Company<br>a corporation of Delaware |

[54] METHOD OF SAND CONSOLIDATION
8 Claims, 1 Drawing Fig.

[52] U.S. Cl. .................................................. 166/276,
166/295
[51] Int. Cl. ...................................................... E21b 43/04,
E21b 33/138
[50] Field of Search ........................................... 166/276,
295, 278, 294

[56] References Cited
UNITED STATES PATENTS

| 2,476,015 | 7/1949 | Wrightsman | 166/295 |
|---|---|---|---|
| 2,674,323 | 4/1954 | Cardwell | 166/276 |
| 2,941,594 | 6/1960 | Ladd et al. | 166/295UX |
| 2,986,538 | 5/1961 | Nesbitt et al. | 166/295X |
| 3,070,160 | 12/1962 | Reistle, Jr. | 166/276X |
| 3,353,599 | 11/1967 | Swift | 166/278 |
| 3,362,475 | 1/1968 | Huitt et al. | 166/278 |
| 3,378,071 | 4/1968 | Sparlin | 166/295 |
| 3,393,736 | 7/1968 | Goodwin | 166/276 |
| 3,393,739 | 7/1968 | Rosenberg | 166/295 |
| 3,443,637 | 5/1969 | Sparlin et al. | 166/295 |

Primary Examiner—Stephen J. Novosad
Attorneys—James A. Reilly, John B. Davidson, Lewis H. Eatherton, James E. Gilchrist, Robert L. Graham and James E. Reed ABSTRACT: A method for consolidating an incompetent formation surrounding a wellbore wherein a bed of coarse particulate material of sufficient height to retain gummy residues that may plug the perforations or face of the formation is placed in the wellbore adjacent the formation and resin-forming materials are injected through this bed into the formation.

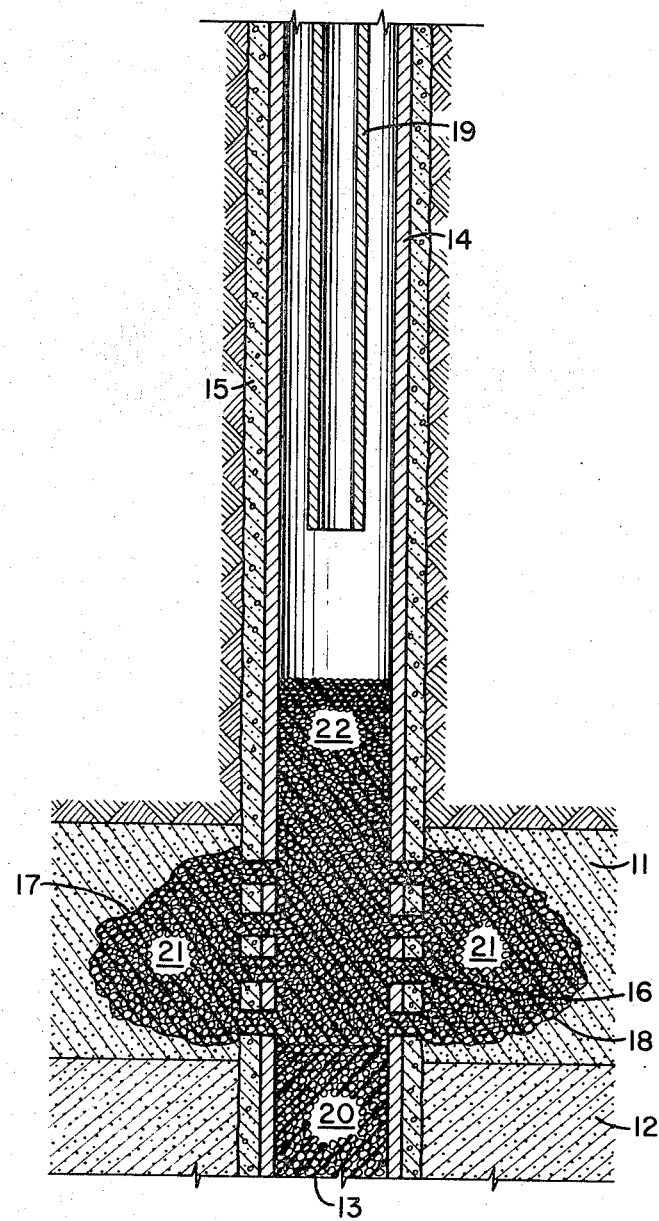
WILLIAM M. TERRY INVENTOR.
BY James E. Reed
ATTORNEY

METHOD OF SAND CONSOLIDATION

BACKGROUND OF THE INVENTION

1. Field of the Invention

This invention relates to the use of resins for the consolidation of incompetent subterranean formations surrounding oil wells, gas wells, and similar boreholes.

2. Description of the Prior Art

Plastic sand consolidation techniques have been widely used for preventing the entrainment of sand in fluids produced from incompetent formations surrounding oil and gas wells. These techniques frequently involve the injection of a resinous liquid into the incompetent formation, the flushing of the formation with an inert fluid to distribute and displace the resinous material, and the subsequent injection of a catalyst or curing agent to harden the injected resin and thus bond the sand grains in place. Experience has shown that such techniques sometime present difficulties because of the accumulation of gummy residues that tend to plug the perforations and the face of the producing formation. These residues are apparently formed by interaction of the catalyst or curing agent with small amounts of the resinous material that adhere to the tubing wall and are not swept away by the inert flushing agent. The presence of even small quantities of such a residue may plug the formation and prevent successful production of the well.

SUMMARY OF THE INVENTION

This invention provides an improved method for the consolidation of subterranean formations which at least in part avoids the problems referred to above. In accordance with the invention it has now been found that difficulties encountered due to plugging of the perforations and the face of the formation with resinous materials during sand consolidation can be alleviated by placing a bed of coarse particulate material in the wellbore adjacent to the formation and thereafter injecting the materials employed for consolidation purposes through this bed into the formation. The bed of solid particles provides a large surface area on which any partially cured resin present in the system can be deposited. Because of the large pore spaces and high porosity of such a bed, relatively thick resin films can be built-up around the solid particles without significantly reducing the permeability of the bed. This permits the removal of any partially cured resin that might otherwise tend to interfere with continued injection of the catalyst or hardening agent or to obstruct fluid flow through the consolidation portion of the formation.

BRIEF DESCRIPTION OF THE DRAWING

The attached drawing shows, in vertical section, the lower portion of a well and the surrounding subterranean formations following a sand consolidation operation carried out in accordance with the invention.

DESCRIPTION OF THE PREFERRED EMBODIMENTS

The method of the invention may be carried out with a variety of different resinous materials. Phenol-formaldehyde type resins prepared by the reaction of formaldehyde, acetaldehyde, propionaldehyde or a mixture of water-soluble aldehydes with a low molecular weight hydroxy aryl compound such as phenol, cresol, β naphthol, resorcinol, xylenol, cresylic acid or a mixture of such compounds in a weight ratio between about 1:1 and about 9:1 are preferred. The reaction of these materials to form the resins can be catalyzed by the addition of from about 2 percent to about 10 percent by weight, based on the aldehyde-hydroxy aryl compound mixture, of an alkaline catalyst such as guanidine carbonate, aminoquanidine bicarbonate, sodium hydroxide, sodium carbonate, ethyl amine, triethyl amine, aniline, ethylene diamine, or the like. From about 0.25 percent to about 10 percent by weight, based on the aldehyde-hydroxy aryl compound mixture, of an acid catalyst such as stannous chloride, magnesium chloride, hydrochloric acid, sulfuric acid, maleic anahydride, picric acid, benzine sulfonic acid, sulfanalic acid, α naphthylamine sulfonic acid, sodium-1 naphthylamine-3,6,8-trisulphonate, or the like can be used.

The water-soluble aldehyde, the low molecular weight hydroxy aryl compound, and the catalyst employed for production of the phenol-formaldehyde-type resins may be mixed before they are injected into the formation or may be utilized in a two-stage procedure. The solution injected in the first stage of such a two-stage procedure will normally include all the reactants except the low molecular weight hydroxy aryl compound. The solution injected in the second stage will generally be an oil solution which contains the hydroxy aryl compound and is substantially immiscible with the first solution. The second solution displaces excess quantities of the first solution from the pore spaces in the formation, and at the same time contributes low molecular weight hydroxy aryl compound to the remaining portion of the first solution to permit reaction of the materials and formation of the resin. The use of phenol-formaldehyde resins and reactive mixtures which produce such resins has been described at length in the patent literature and will be familiar to those skilled in the art.

Epoxy resins can be used for purposes of the invention in lieu of the aldehyde-type resins described above. Useful epoxies include the diglycidyl ethers of bisphenol A[bis(4-hydroxy phenol) dimethyl methane] obtained by the reaction between epichlorohydrin (1-chloro-2,3 epoxy propane) and bisphenol A in the presence of an alkali such as sodium hydroxide or potassium hydroxide. Similar resins can be prepared by reacting a mononuclear di- or trihydroxy phenol such as resorcinol, hydroquinone, pyrocatechol, or phloroglucinol or a polynuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrin.

The epoxy resins are employed in conjunction with curing agents or catalysts such as diethylene triamine, ethylene diamine, triethylene tetramine, dimethylamino propylamine, diethylamino propylamine, piperidine, menthane diamine, triethylamine, benzyldiethylenediethylamino phenol, ditrimethylaminomethylphenol, α methylbenzyl dimethylamine, meta xylenediamine, 4,4-methylene dianiline, and mixtures of such amines. Acidic catalysts such as oxalic acid, phthalic acid, pyromellitic acid, pyromellitic dianhydride, and dodecenyl succinic anahydride can also be employed.

the epoxy resins may be used in single stage operations wherein a mixture of the resin and an inert diluent is injected into the formation or in two-stage operations in which the resin is first dissolved in a solvent such as a mixture of ethyl alcohol, acetone or ethyl ketone with kerosene, diesel oil or white oil containing added aromatics and ink injected into the formation and a kerosene or similar oil that is substantially free of aromatics and contains a catalyst or curing agent is thereafter injected. The latter solution displaces the resin solution from the pore spaces. Catalyst or curing agent contained in the second solution is extracted by the resin solution that remains in contact with the sand grains. In the presence of the extracted catalyst or curing agent the resin hardens and bonds the individual sand grains in place. The use of epoxy resins in both single stage and two-stage sand consolidation processes has been described in the prior art.

Still other resins that may be employed in carrying out the invention include the furfuryl alcohol resins and the urea formaldehyde resins. The furfuryl alcohol formulations are generally utilized by injecting furfuryl alcohol, furfuryl alcohol resin, or a mixture of the alcohol and resin into the formation and thereafter pumping in an oil overflush solution containing a low molecular weight organic acid such as trichloroacetic acid or a delayed acid-producing chemical as a catalyst or curing agent. An oil preflush containing a surface active agent is generally used to remove water blocks and render the sand preferentially wet. The resin solution usually contains a surfactant and a silane compound designed to improve bonding to the sand grains. A diesel oil "spacer" is normally injected between the resin solution and the catalyst or curing agent solution. The urea formaldehyde resins are employed by injecting an aqueous solution containing urea, formaldehyde, and an accelerator such as ammonium sulfate or ammonium chloride, and a retarder such as ammonium hydroxide or hexamethylene tetramine, into the formation and allowing the material to set. Magnesium chloride or similar chloride salt can be added to facilitate polymerization in carbonate formations. Further details concerning these furfuryl alcohol and urea formaldehyde resins can be found in the literature.

The resins described above can be used for the consolidation of formations surrounding oil wells, gas wells, and similar boreholes. The well shown in the drawing is a flowing oil well extending from the earth's surface through an unconsolidated oil-bearing formation 11 into a lower formation 12. The lower part of the well thus forms a "rat hole" 13 extending below the producing zone. A string of casing 14 has been st set in place and surrounded by cement 15 in the conventional manner. Perforations 16 extend through the casing and cement into the producing formation. The production of fluids containing entrained sand through the perforations has resulted in the formation of a cavity in the producing zone surrounding the wellbore. The boundaries of this cavity are indicated by reference numerals 17 and 18. Tubing string 19 extends downwardly in the wellbore from the earth's surface to a point a short distance above the producing zone. The arrangement of this well is typical of those in which the method of the invention is useful but the method can be used in wells with other configurations, including both pumping wells and flowing wells.

In using the resins to consolidate the formations surrounding a well such as that shown in the drawing, the well will normally first be killed by pumping in crude oil, diesel fuel, salt water, or a similar fluid through tubing string 19. If the well is a pumping well, rather than a flowing well, the pump and auxiliary equipment should then be removed. Once this has been done, accumulated sand should be removed from the wellbore. This can be done by circulating salt water, diesel oil or a similar fluid down tubing string 19 and up the annulus between tubing 19 and casing 14 to entrain the sand and carry it to the earth's surface. Circulation of the fluids should be continued until the sand has been washed out of the wellbore to a level below the perforations 16, leaving the rat hole 13 filled with formation sand 20. In new completions where there has been little or no production of fluids and entrained sand, this wash out procedure may be unnecessary and can often be omitted.

If the well in which the consolidation operation is to be carried out is one from which there has been substantial fluid production, cavities will generally have been formed in the producing formation behind the casing. Reference numerals 17 and 18 in the drawing indicate the boundaries of cavities adjacent the wellbore. These cavities should be filled with sand, gravel, glass beads, metallic shot, or similar particulate solids 21 to prevent subsidence of the formation and avoid damage to the casing. This can be done by suspending the sand, gravel, or other solids in salt water, diesel oil, or a similar fluid by means of a blender located on the surface and then injecting the resultant slurry down the well into the perforations. A thickened fluid may be used to transport the solid particles if desired. It is normally preferred to employ particles having sizes in the range between about 20 mesh and about 4 mesh on the U. S. sieve series scale. Best results are normally obtained by using a material that has been screened so that all of the particles fall into a relatively narrow size range. Wide variations in size promote close packing of the particles and result in lower permeability than is obtained with more uniform particles. The size selected will depend in part upon the permeability of the formation itself. In general, the use of 10 mesh or larger particles is preferred. Sand or gravel screened to a substantially uniform size, 6 to 10 mesh for example, is particularly effective.

After any cavities behind the casing have been filled with sand, gravel, or other solids as described above or, in a new well in which little or no formation sand has accumulated, after the rat hole has been filled with the sand, gravel, or the like, additional particulate material is injected until a bed 22 extending several feet above the uppermost perforation has been formed in the wellbore. The height of this bed should be such that there will be sufficient surface area for the accumulation of any prepolymerized resin that may be produced as a result of the mixing of the consolidating agents in the wellbore. The height needed will depend in part on the volume of resin and curing agent to be injected into the well, the size of the tubing and casing, the depth of the well, and the size of the particles used to form the bed. In general, it is preferred that the upper surface of the bed be located at least 3 feet above the uppermost perforations and that on large jobs a bed extending 6 feet or more above the perforations be used. Such a bed provides a large surface area for the accumular accumulation of a film of prepolymerized resin without plugging the pore spaces through which unpolymerized materials must pass into the perforations and surrounding formation.

Following deposition of the sand, gravel, or other solids in the wellbore as described above, the consolidating agent may be injected into the well and surrounding formation in the convention manner. Depending upon the particular resin selected, either a single stage or a two-stage procedure may be used. Any gummy material formed in the wellbore as a result of premature mixing of the resin and catalyst or accumulation of the resinous material on the tubing wall tends to accumulate on the surfaces of the particles making up the bed. The large pore spaces and high porosity of the bed permit the deposition of relatively thick resinous films without detriment to the permeability of the bed. The permeability will normally be sufficiently high that the bed will offer no significant obstruction to fluid flow after the well is returned to operation. If desired, however, all or part of the consolidated sand, gravel, or other solid particles present in the wellbore at the conclusion of the consolidation operation can be removed by drilling and washing out the debris. This permits access to the perforations should such access be necessary but is usually not a prerequisite to satisfactory production of fluids from the formation.

I claim:

1. A method for the consolidation of a poorly consolidated subterranean formation surrounding a wellbore which comprises injecting particles of a solid essentially insoluble in the connate fluids present in said formation into said wellbore until a bed of particles extending above said poorly consolidated formation has been formed in the wellbore, said particles being greater than about 20 mesh in size, and thereafter injecting a resinous material through said bed of particles into said formation.

2. A method as defined by claim 1 wherein said particles are sand grains.

3. A method as defined by claim 1 wherein said bed of particles extends at least 3 feet above said poorly consolidated formation.

4. A method as defined by claim 1 wherein said resinous material comprises a phenol-formaldehyde resin.

5. A method as defined by claim 1 wherein said resinous material is injected into said formation in two stages.

6. A method as defined by claim 1 wherein said resinous material comprises an epoxy resin.

7. A method as defined by claim 1 wherein said particles are greater than about 10 mesh in size.

8. A method as defined by claim 1 wherein said resinous material comprises a furfuryl alcohol resin.